UNITED STATES PATENT OFFICE.

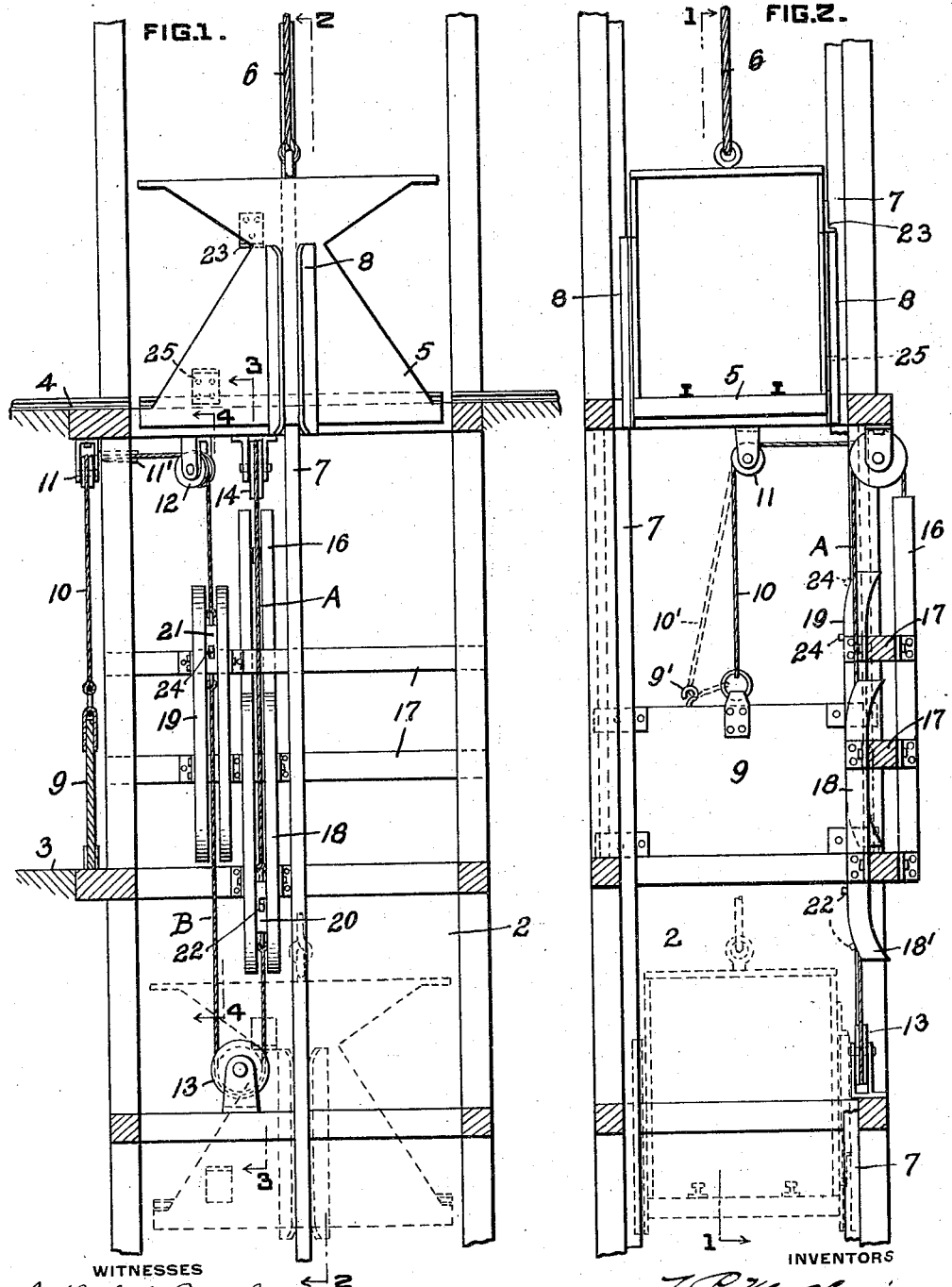

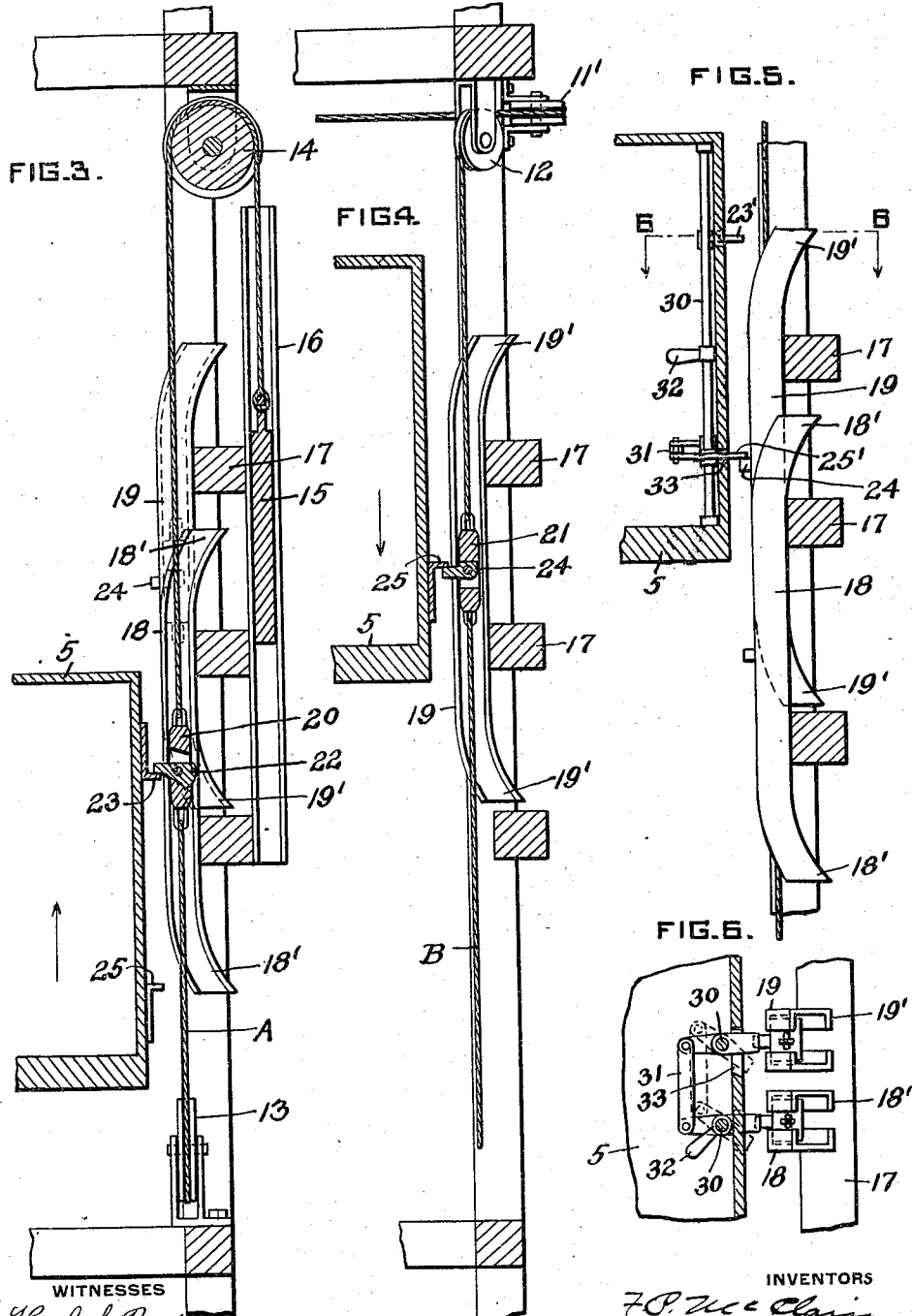

FRANK P. McCLAIN AND JOHN A. FUTCHER, OF RILLTON, PENNSYLVANIA.

MINE-SHAFT GATE.

1,191,806. Specification of Letters Patent. Patented July 18, 1916.

Application filed January 22, 1916. Serial No. 73,701.

*To all whom it may concern:*

Be it known that we, FRANK P. McCLAIN and JOHN A. FUTCHER, both citizens of the United States, and residents of Rillton, in the county of Westmoreland and State of Pennsylvania, have invented certain new and useful Improvements in Mine-Shaft Gates, of which the following is a specification.

The primary object of this invention is to provide an automatic gate of improved construction for shaft landings, and particularly the ground level landing, the gate by preference being adapted to be operated each time it is passed by the cage regardless of whether the latter is moving upward or downward. And with the cage brought to a standstill at the controlled landing, the gate is held elevated and in open position and cannot close until after the cage has moved either upwardly or downwardly as the case may be.

A further object is to provide trip mechanism of novel design for automatically disconnecting the actuating means from the cage after the latter has either raised or lowered sufficiently to render it desirable to close the gate, at such time the connection between the cage and the gate actuating means being automatically broken and the gate closes immediately and automatically.

Still a further object is to provide means within the cage and under the control of an operator stationed therein whereby the gate is automatically opened if the landing is to be used, or passed without opening if no stop is to be made.

While the invention is designed primarily for use in mine shafts, the automatic gate control afforded thereby meeting the safety requirements imposed by State laws and other regulations controlling the operation of mine hoists, it will be understood that the invention is adapted for use in buildings or wherever the automatic control furnished thereby may be advantageously used.

In the accompanying drawings, Figure 1 is a sectional elevation of a mine shaft and gate-controlled landing thereof equipped with the improved mechanism, taken on line 1—1 of Fig. 2, and Fig. 2 is a similar view taken on line 2—2 of Fig. 1, in each of said views the cage being shown in full lines above the gate-operating mechanism and in dotted lines beneath said mechanism. Figs. 3 and 4 are vertical sections similar to Fig. 2 but drawn to a larger scale and taken, respectively, on lines 3—3 and 4—4 of Fig. 1, in each view a portion of the cage being shown in operative relation with the gate-actuating devices. Fig. 5 is a sectional elevation similar to Fig. 2, illustrating a modified form of actuating device for the cage, and Fig. 6 is a sectional plan view taken on line 6—6 of Fig. 5.

Referring to the drawings, 2 designates a mine shaft, and 3 is the ground landing thereof and 4 the tipple landing.

5 is the cage suspended within the shaft by cable 6, the cage being held in place on the vertical shaft guides 7 by the keepers 8 secured to opposite sides of the cage.

The mechanism thus far described is of usual and well known construction.

The mechanism of the present invention is designed primarily for controlling the shaft gate 9 at landing 3, said gate being secured to one end of the operating cable 10. The cable extends upwardly and around suitable guide sheaves 11 and 11' and from the latter downwardly around sheave 12 in the vertical course B, and then upwardly around sheave 13 in the vertical course A parallel with course B, at the upper end of course A the cable passing out over sheave 14 with a counterweight 15 secured to the extremity thereof, the weight movable in guide 16 secured to the transverse shaft timbers 17.

The parallel cable courses B and A extend, respectively, through the vertical channel-like guideways 18 and 19 secured to the inner sides of timbers 17, the extremities of these guideways being deflected outward, respectively, as indicated at 18' and 19'. Movable within guideway 18 is the slide-forming head 20 which comprises in effect a link in the length of cable course A, and a somewhat similar slide 21 in guideway 19 is connected in link fashion in course B. The faces of guideways 18 and 19 adjacent cage 5 are slotted vertically, and pivoted in an opening in slide 20 is the trip-forming pawl 22 which normally projects through the slotted guide 18 in position to be engaged by stop 23 projecting from the cage when the latter is moving in an upward direction, as in Fig. 3, but when the cage is moving downward stop 23 simply oscillates the pawl 22 on its pivot and the parts pass each other without any operative effect. A reverse condition is arranged with reference to slide 21, the pivoted pawl 24 thereof normally projecting through the slotted guide 19 and free to turn upwardly out of the way of stop 25 carried by the cage, but adapted to be positively engaged by said stop when the cage is moving downwardly, as in Fig. 4.

Operation: The gate and gate operating mechanism are normally in the position shown in Figs. 1 and 2, the gate being heavier than the counterweight 15 and hence normally lowered and in closed position with the counterweight elevated. As the cage approaches the ground landing on its upward travel, stop 23 engages pawl 22, as in Fig. 3, and the resulting upward pull on course A of the cable exerts a downward pull on course B and an upward pull on the portion of the cable connected to gate 9 thereby elevating the latter, and the connection between said stop and pawl is maintained when the cage is at landing 3. As the cage moves upwardly from the landing, slide 20 is deflected into the terminal offset 18' of guideway 18, thereby withdrawing pawl 22 from engagement with stop 23, and as soon as the parts are disconnected the predominating weight of the gate causes it to lower to closed position, thereby restoring courses A and B and slides 20 and 21 to normal position. Upon moving downwardly, as from tipple landing 4, stop 25 engages pawl 24 of course B, as in Fig. 4, thereby depressing said course and opening the gate as the cage approaches landing 3 on its downward travel. As soon as the cage lowers from the landing, slide 21 is deflected into offset 19' of guideway 19, thereby breaking the connection and permitting the gate to close automatically as above described. From the foregoing it will be seen that the inactive pawl is simply idly rocked by the stop projecting from the cage, the parts slipping past each other without in any way interfering with the active pawl. To avoid unnecessary opening and closing gate 9 when the cage is raising and lowering pit cars to and from tipple landing 4, cable 10 may be held depressed by a hook 9' on the gate, as shown in dotted lines at 10', Fig. 2, thereby raising pawl 24 into the top deflection 19' of guide 19 and similarly depressing pawl 22 into the bottom deflection 18' of guide 18. The pawls are thus retained out of the paths of the cage-carried stops and the gate remains inactive.

In some uses, as in connection with building elevators or other hoists where it is desired to have the gate-opening operation under the control of an attendant stationed in the cage, the pawl-actuating stops 23' and 25' (corresponding, respectively, to stops 23 and 25 fixed to the cage) may be secured to the rotatable vertical shafts 30 mounted in the cage, Figs. 5 and 6, the shafts being connected by link 31 and with one of said shafts provided with a handle 32 whereby the stops may be projected for operating the pawls, as in full lines in Fig. 6, or retracted to avoid such operation, as in dotted lines in the same view. The side wall of the cage is slotted at 33 to permit the stops to move in the manner described. By this means the gate at any landing of the shaft and provided with the automatic operating means herein described, may be opened automatically as the cage approaches from either direction, or such gate may be passed without being operated if no stop is to be made.

We claim:

1. In combination, a normally-closed gate for a vertical shaft landing, a vertically movable cage in said shaft, a gate operating cable applied to said gate and provided with a counterweight, means arranging an intermediate portion of said cable to provide two vertical spaced oppositely-movable cable lengths in said shaft, each length provided with a slide and trip device, a pair of vertical slideways in said shaft for said slides respectively, the cage being provided with gate-opening projections corresponding to said trips, respectively, each slideway being deflected outwardly at its upper and lower ends to remove the trip of its slide from the path of movement of its corresponding gate-opening projection of the cage, and means for adjusting the gate operating cable to maintain the slides in deflected ends of the slideways with both trips from operative relation with respect to both gate opening projections, substantially as described.

2. In combination, a normally closed gate for a shaft landing, a cage movable vertically in the shaft, a vertical slideway along the shaft with its upper and lower ends deflected outwardly, a counterweighted gate operating cable provided with a slide movable in said slideway, the cage and slide provided with coöperating devices to slip past each other when the cage is moving in one direction and to operatively engage to move the slide and cable with the cage to open the gate when the cage is moving in the opposite direction and to operatively disengage when the slide enters one deflected end of the slideway, and means whereby the cable can be abnormally adjusted to maintain the slide in the other deflected end of the slideway, substantially as described.

3. The combination of a normally closed gate for a shaft landing; a cage movable vertically in the shaft; a counterweighted gate operating cable; means arranging an intermediate portion of said cable to provide vertical oppositely-movable cable lengths at one side of the shaft, each length provided with a slide carrying a trip device; parallel adjacent slideways for said slides; gate opening projections carried by one side of the cage and corresponding to said trip devices respectively; means for automatically disengaging a trip device and its corresponding cage projection at the end of each gate opening movement; said projections being swingable to and from operative relation with respect to the trip devices; and a manually operated rock shaft and link connections whereby said projections are simultaneously swung to and from operative relation with said trip devices, said rock shaft having a handle within the cage, substantially as described.

In testimony whereof we affix our signatures in presence of two witnesses.

FRANK P. McCLAIN.
JOHN A. FUTCHER.

Witnesses:
JOHN C. FREDERICK,
W. F. GALLAGHER, Jr.